(12) United States Patent
Scherf et al.

(10) Patent No.: US 7,718,934 B2
(45) Date of Patent: *May 18, 2010

(54) INDUCTION OVEN EXCITATION ARRANGEMENT FOR AIRCRAFT

(75) Inventors: Marko Scherf, Saalfeld (DE); Markus Bannwarth, Freiburg (DE); Ansgar Schuler, Stegen (DE)

(73) Assignee: Ruettinger Elektronik GmbH + Co. KG, Freiburg (DE)

( * ) Notice: Subject to any disclaimer, the term of this patent is extended or adjusted under 35 U.S.C. 154(b) by 849 days.

This patent is subject to a terminal disclaimer.

(21) Appl. No.: 11/381,058

(22) Filed: May 1, 2006

(65) Prior Publication Data
US 2006/0289488 A1 Dec. 28, 2006

(30) Foreign Application Priority Data
Apr. 30, 2005 (DE) ........................ 10 2005 020 164
Jun. 18, 2005 (DE) ........................ 10 2005 028 283

(51) Int. Cl.
H05B 6/12 (2006.01)
H02M 7/00 (2006.01)
(52) U.S. Cl. ...................................... 219/622; 363/124
(58) Field of Classification Search ................. 219/622, 219/661, 620–631; 363/124
See application file for complete search history.

(56) References Cited

U.S. PATENT DOCUMENTS

| | | | | |
|---|---|---|---|---|
| 3,740,513 A | * | 6/1973 | Peters et al. | 219/622 |
| 5,122,946 A | | 6/1992 | Taylor | |
| 5,450,305 A | | 9/1995 | Boys et al. | |
| 6,359,268 B1 | * | 3/2002 | Walter | 219/622 |
| 6,670,589 B2 | * | 12/2003 | Wyatt | 219/621 |
| 7,151,242 B2 | * | 12/2006 | Schuler | 219/620 |

FOREIGN PATENT DOCUMENTS

WO   WO 02/43085   5/2002

OTHER PUBLICATIONS

Internet http://www.analogzone.com/pwrp0314.htm, "powerZONE Products for the week of Mar. 14, 2005" by Infineon Technologies.
Sun, Jian, "Analysis and Design of Single-Phase PFC Converters for Airborne Systems", IECON 2003 Proceedings of the 29th Annual Conference of the IEEE Industrial Electronics Society, Roanoke, VA, 2003, pp. 1101-1109, Nov. 2-6, 2003.

(Continued)

Primary Examiner—Daniel Robinson
(74) Attorney, Agent, or Firm—Fish & Richardson P.C.

(57) ABSTRACT

An aircraft induction oven excitation arrangement includes at least one connection for an on-board power supply system, at least one power supply rectifier that can be connected to a phase of the power supply system, a converter that is arranged downstream of the at least one power supply rectifier and that includes a switching element, a controller that drives the at least one converter, a rectifier that is arranged downstream of the converter in order to produce an intermediate circuit voltage, an inverter that is connected to the intermediate circuit voltage. The switching element has a turn-on resistance $R_{dson}$ $\leq$ about 0.1$\Omega$ and a self-capacitance $\leq$ about 200 pF at voltages of $\geq$ about 200 V across the switching element.

23 Claims, 4 Drawing Sheets

OTHER PUBLICATIONS

Preliminary Search Report for corresponding French Application No. 0603873 with English translation, mailed Oct. 31, 2008, 8 pages.

Infineon Technologies, "CoolMOS™ Power Transistor" brochure, May 8, 2000, pp. 1-12.

Infineon Technologies, "CoolMOS™ AN-CoolMOS-08 SMPS Topologies Overview", Apr. 2002, pp. 1-18.

Infineon Technologies, "CoolMOS™ Power Transistor" brochure, Dec. 2, 2004, pp. 1-9.

Infineon Technologies, "CoolMOS™ Power Transistor" brochure, Mar. 10, 2005, pp. 1-9.

International Rectifier, "SMPS MPSFET" brochure, Oct. 20, 2004, pp. 1-8.

Modular Galley Systems, "Induction Heating Unit", Apr. 2005, pp. 1-9.

Ortmeyer et al., "Application Note: Design tips for L6561 Power Factor Corrector in Wide Range", Dec. 2000, pp. 1-6.

SGS-Thomson Microelectronics, "N-Channel Enhancement Mode" brochure, Mar. 1998, pp. 1-9.

Sun, Jian, "Analysis and Design of Single-Phase PFC Converters for Airborne Systems", Industrial Electronics Society, The $29^{th}$ Annual Conference with the IEEE, vol. 2, Nov. 2-6, 2003, pp. 1101-1109, vol. 2.

\* cited by examiner

INDUCTION OVEN EXCITATION ARRANGEMENT FOR AIRCRAFT

CROSS-REFERENCE TO RELATED APPLICATIONS

This application claims priority under 35 U.S.C. §119(a) to German Patent Application No. 10 2005 020 164.4, filed on Apr. 30, 2005 and German Patent Application No. 10 2005 028 283.0, filed on Jun. 18, 2005, the entire contents of both of which are hereby incorporated by reference.

TECHNICAL FIELD

The invention relates to an induction oven excitation arrangement that can be used on an aircraft to heat meals and/or drinks.

BACKGROUND

In aircraft, ovens can employ resistance heating and recirculated air for heating meals and/or drinks. As an alternative to resistance heating ovens, induction ovens can be used on aircraft. Compared with resistance heating ovens, induction ovens tend to be more efficient, thus consuming less electricity, can be made in a smaller design and with lighter weight, can heat the meals in a relatively shorter time, and tend to remain cooler on exterior surfaces.

For induction ovens in aircraft, there are additional design constraints that differ from conventional requirements for induction ovens that are not used on aircraft. For example, aircraft induction ovens typically weigh as little as possible; operate on the aircraft alternating voltage power supply system, that is, a three-phase alternating current typically having $115V_{eff}$ from phase to neutral conductor, currently having frequencies of 400 Hz, but will in the future have frequencies that vary from 360 to 800 Hz; and produce only a small number of harmonic frequencies (harmonic oscillations).

The design constraint relating to harmonic frequencies is described in detail in J. Sun, "Analysis and Design of Single-Phase PFC Converters for Airborne Systems", Industrial Electronics Society, 2003. IECON '03, The $29^{th}$ Annual Conference of the IEEE 2-6 Nov. 2003, P. 1101-1108. In order to comply with the design constraints on aircraft, Sun suggests use of active converters, so-called PFC (power-factor correction) converters, which shape the characteristic of the input current. A PFC converter includes an inverter that is controlled by a PFC controller. Inverters that are arranged downstream of a power supply rectifier are controlled by the PFC controller in such a manner that as few harmonic frequencies as possible are produced, that is, a current that is sinusoidal to the greatest possible extent is drawn from the power supply system. The PFC controllers that are available on the market are optimized for land-based electrical power supply systems with 50 and 60 Hz and can have defects at 400 Hz and in particular at up to 800 Hz.

The PFC controller described by Sun uses a measurement of the power supply input voltage and the power supply input current and controls the inverter in such a manner that the power supply input current follows the shape of the power supply input voltage as closely as possible. To this end, it is advantageous to have a correct measurement of the input voltage and the input current. As the power supply frequency increases, however, some problems occur in taking this measurement. In particular, occurrences of distortion in the current flow during zero crossing of the input voltage (zero-crossing distortion) can occur. Sun concentrates on the measurement errors that can occur during the measurement of the current. These errors become worse as frequencies increase and the increased requirements for aircraft power supply systems lead to additional measures that are taken in order to keep the harmonic frequencies that are produced under the required limits. Sun suggests phase correction, a so-called "adaptive current loop gain" or a "feedforward control."

To prevent "zero-crossing distortion," it is suggested in Application Note AN1214 "Design Tips for L6561 Power Factor Corrector in Wide Range" ST, PP. 1-6, December 2000 (Note AN1214) to use a transistor having a low Drain-Source Capacitance $C_{oss}$ in a boost converter that at the same time has a high turn-on resistance $R_{dson}$ and a low breakdown voltage. Note AN1214 suggests using a transistor STP6NB50 from SGS-Thomson. Furthermore, Note AN1214 suggests to lower the switching frequency of the transistor to prevent zero-crossing distortion. However, this can lead to higher levels of inductance for the transformer of the converter and consequently to a higher weight.

The self-capacitance of the inductor of the boost converter can be reduced by using additional isolation strips or chambers in the inductor. The inductor of the boost converter corresponds to the transformer in the flyback converter.

The capacitance of the capacitor in the primary circuit can be reduced to reduce the distortion of the voltage shape. However, other occurrences of interference can couple into the device or decouple from the on-board power supply system when the capacitance is reduced too much.

SUMMARY

In one general aspect, an induction oven excitation arrangement for aircraft is described below that can be used in a frequency range of from 360-800 Hz, which is the frequency of the three-phase alternating current of the aircraft on-board voltage power supply system, but still maintain a low level of harmonic frequency production.

The aircraft induction oven excitation arrangement includes a switching element that is constructed as a switching element having a turn-on resistance $R_{dson} \leq$ about 0.1Ω and a self-capacitance $\leq$ about 200 pF at voltages of $\geq$ about 200 V across the switching element.

In another general aspect, an aircraft induction oven excitation arrangement includes at least one connection for a power supply system on the aircraft, at least one power supply rectifier connected to a phase of the power supply system, at least one converter that is arranged downstream of the at least one power supply rectifier and that includes a switching element, a controller that drives the at least one converter, a rectifier that is arranged downstream of the at least one converter and that produces an intermediate circuit voltage, and an inverter that is connected to the intermediate circuit voltage. The switching element has a turn-on resistance less than or equal to about 0.1Ω and a self-capacitance less than or equal to about 200 pF at voltages of greater than or equal to about 200 V across the switching element.

Implementations can include one or more of the following features. For example, the at least one connection can include a connection for each phase of the power supply system, the at least one power supply rectifier can include a power supply rectifier for each phase of the power supply system, and the at least one converter can include a converter for each phase of the power supply system. The induction oven excitation arrangement can include a controller that drives each converter of the power supply system, and a rectifier that is arranged downstream of each converter and that produces the intermediate circuit voltage for each phase of the power supply system.

The self-capacitance can change with the voltage across the opened switching element. The self-capacitance can decrease as the voltage across the opened switching element increases.

The converter can include a means for galvanic isolation such as a transformer. The converter can be constructed as a flyback converter, and the means for galvanic isolation can be constructed as a transformer having a primary winding and a secondary winding. The transformer can have a leakage inductance of less than about 1 µH at the primary side and less than about 1 µH at the secondary side. The primary winding can be constructed as a parallel arrangement of a plurality of (part) windings and the secondary winding can be constructed as a series arrangement of a plurality of (part) windings. The (part) windings of the primary winding and the secondary winding can be wound in an interlocking manner on a core. The windings can be formed from flat copper strip. The transformer can have a transformation ratio of between about 1:1 and about 1:2, or a transformation ratio of approximately 1:1.4.

The self-capacitance of the switching element can change in a non-linear manner with the voltage across the switching element. The power supply rectifier can be connected between the phase and the neutral conductor of the power supply system. The switching element can have a self-capacitance of greater than or equal to about 5000 pF at voltages of less than or equal to about 25V across the opened switching element.

The induction oven excitation arrangement can include an anti-interference capacitor connected between the power supply rectifier and a protective conductor. The anti-interference capacitor can be connected between a negative potential of the power supply rectifier and the protective conductor.

The switching element can be operated at a frequency of greater than about 200 kHz. The switching element can be operated at a frequency of greater than about 250 kHz.

The induction oven excitation arrangement can include, for each phase of the power supply system, a power supply rectifier having a flyback converter arranged downstream of the power supply rectifier, a controller, and a rectifier that is arranged downstream of the flyback converter. All the intermediate circuit voltages are interconnected to form a common intermediate circuit voltage.

The induction oven excitation arrangement can include an output connection that connects at least a portion of an oscillating circuit. The induction oven excitation arrangement can include at least one capacitor downstream of the inverter.

In another general aspect, an induction oven includes a plurality of induction oven excitation arrangements, and a common control unit that couples to each of the induction oven excitation arrangements.

In another general aspect, an induction oven excitation arrangement includes a converter arranged to receive a rectified voltage from a power supply and including a switching element that has a turn-on resistance less than or equal to about 0.1Ω and a self-capacitance less than or equal to about 200 pF at voltages greater than or equal to about 200 V across the switching element, and an output of the converter that couples to an inductor for heating.

An aircraft induction oven excitation arrangement having a switching element that is constructed in this manner operates with reduced harmonic frequencies. The turn-on resistance is lower than the levels previously suggested, but enables a reduction of harmonic frequencies for preventing the zero-crossing distortion.

Moreover, harmonic frequencies can be reduced with the excitation arrangement since a higher level of control dynamics can be achieved when the switching element is operated at a frequency of >200 kHz. Furthermore, there is less reactive energy and the number of passive components can be minimized. The transformer in the converter can be constructed so as to be smaller thus resulting in smaller core dimensions and a lower weight.

In another implementation, an aircraft induction oven includes a plurality of aircraft induction oven excitation arrangements that are controlled by a common control unit. Each aircraft induction oven excitation arrangement can be associated with a plate having one or more inductors. The aircraft induction oven excitation arrangements can be stacked one above the other in an oven housing in the same manner as the plates. They are all controlled by a common control unit.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

Like reference symbols in the various drawings may indicate like elements.

DETAILED DESCRIPTION

Figure 1:
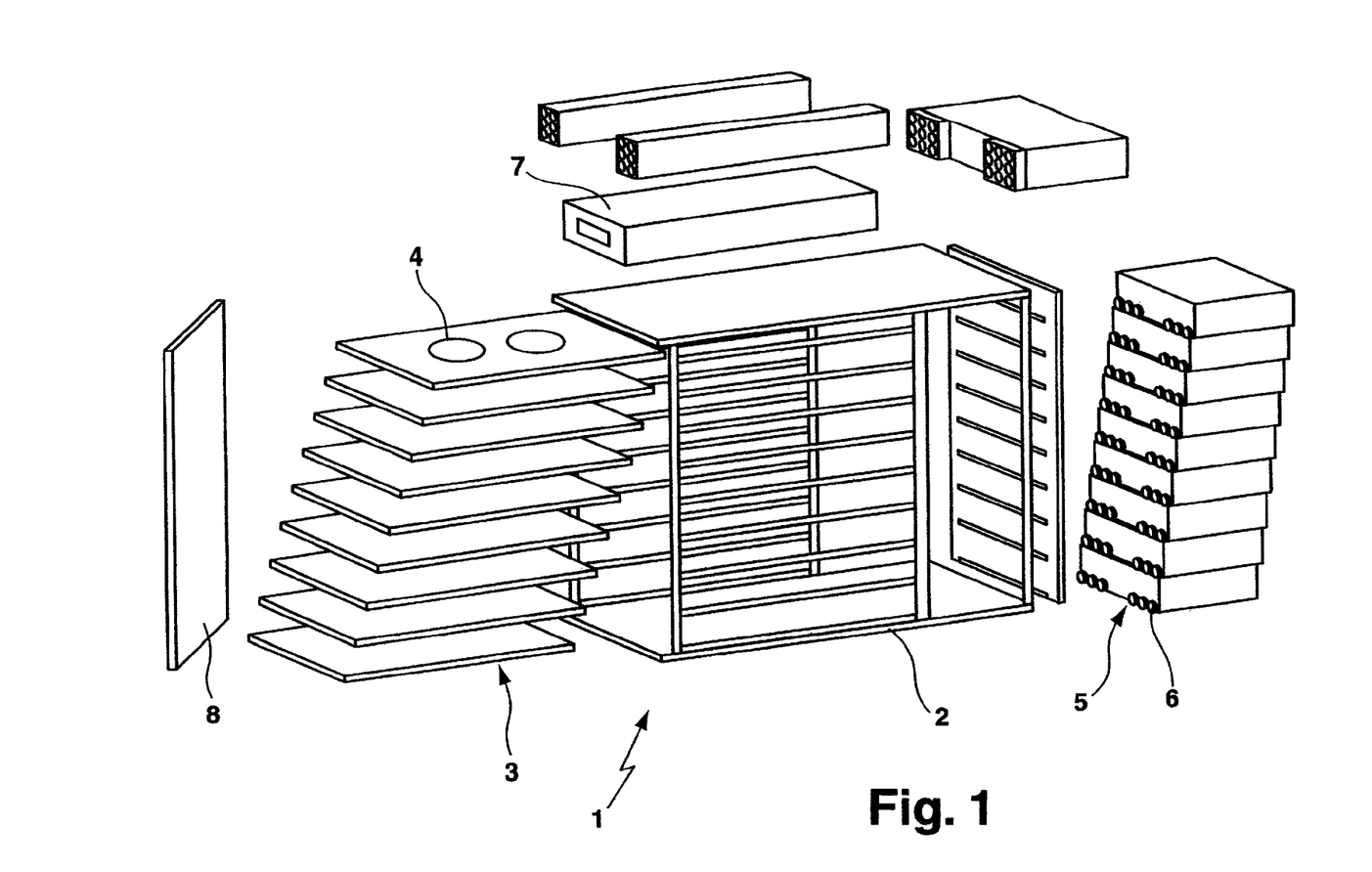
FIG. 1 is an exploded view of an aircraft induction oven.

Referring to FIG. 1, an aircraft induction oven 1 has a housing 2, into which plates 3 that each have at least one inductor 4 can be inserted. Each plate 3 is associated with an aircraft induction oven excitation arrangement 5 that has connectors 6 for connecting to the inductor 4 or to a plurality of inductors 4. The aircraft induction oven excitation arrangements 5 are connected to a common control unit 7. Trays with meals and/or drinks can be placed on the plates 3 to be heated. The trays are selected to be of such a size that they also fit into containers or trolleys that are used by the flight staff to distribute the meals. The oven 1 can be closed by a door 8.

Figure 2:
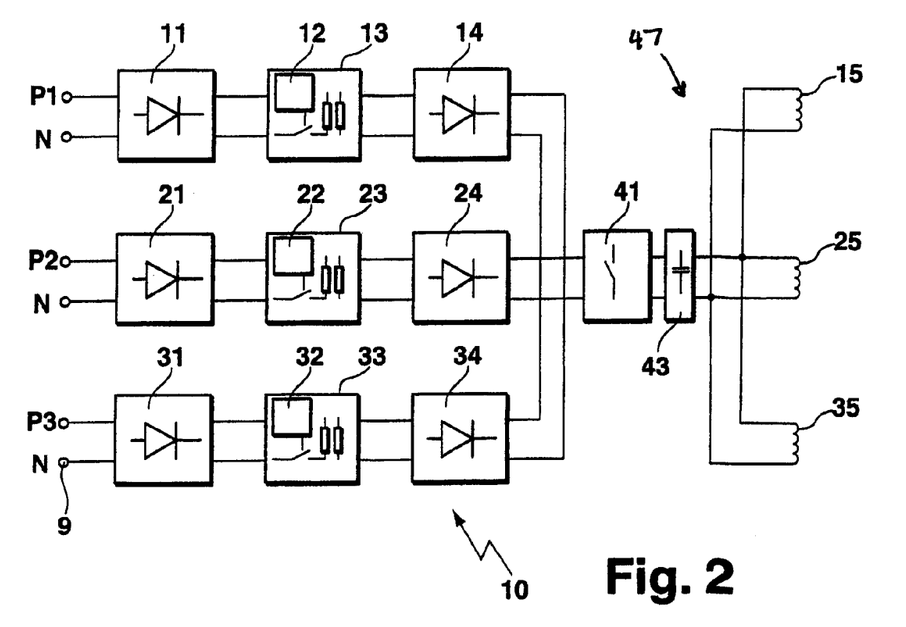
FIG. 2 is a block diagram of an aircraft induction oven excitation arrangement having inductors.

The aircraft induction oven excitation arrangement 5 has an output connection to connect to at least a portion of an oscillating circuit 47 (shown in FIG. 2). The inductors 4 that are used to warm the meals are preferably integral components of the oscillating circuit 47 that is excited by the aircraft induction oven excitation arrangement 5. The inductors 4 may, for example, be arranged in the plates 3 that hold the trays with the meals and/or drinks. The plates 3 can have a complete oscillating circuit, that is, at least one inductor and at least one capacitor can be included in the oscillating circuit, as further discussed below.

In the block diagram of FIG. 2, an aircraft induction oven excitation arrangement 10 is illustrated that can be used as the aircraft induction oven excitation arrangement 5 of the oven 1 shown in FIG. 1 to connect to a load oscillating circuit 47. The voltage of each phase P1, P2, P3 from a power supply system within the aircraft (that is, the on-board power supply system) is rectified relative to a neutral conductor N by means of individual power supply rectifiers 11, 21, 31 that are constructed as a bridge-type rectifiers and that are connected to the on-board power supply system by means of a connection 9. The outputs of the power supply rectifiers 11, 21, 31 are direct voltages that are supplied to converters 13, 23, 33. Each converter 13, 23, 33 is constructed as a flyback converter and is driven by a power-factor correction (PFC) controller 12, 22, 32. The PFC controllers 12, 22, 32 ensure that a current that is sinusoidal to the greatest possible extent is drawn from the power supply connection and harmonic frequency components acting on the power supply therefore remain small. The output alternating voltages of the converters 13, 23, 33 are again individually rectified by means of rectifiers 14, 24, 34 to produce respective intermediate circuit voltages. Each of the intermediate circuit voltages are interconnected to form a common intermediate circuit voltage U4. The intermediate circuit voltage U4 can be adjusted by controlling the converters 13, 23, 33. The power control of the load oscillating circuit 47 is thereby carried out. Moreover, all the phases of the on-board power supply system are loaded to the same extent using the excitation arrangement 10. Harmonic frequencies can be reduced or prevented by interconnecting the intermediate circuit voltages of each phase of the on-board power supply system to a common intermediate circuit voltage.

The excitation arrangement 10 includes a common inverter 41 connected to the intermediate circuit voltage from the rectifiers 14, 24, 34. At least one capacitor 43 of the load oscillating circuit 47 in the plates 3 can be arranged downstream of the inverter 41. Thus, the capacitor of the load oscillating circuit 47 is part of the aircraft induction oven excitation arrangement 10 and only one or more inductors 15, 25, 35 need to be connected to the aircraft induction oven excitation arrangement 10. In this case, it is not necessary for any additional capacitors to be connected or to be provided in the plates 3. The output of the inverter 41 supplies the load oscillating circuit 47 with electrical power. Thus, the one or more capacitors 43 and the inductors 15, 25, 35 for induction heating are integrated in the load oscillating circuit 47 and heat the meals on the plates 3.

Figure 3:
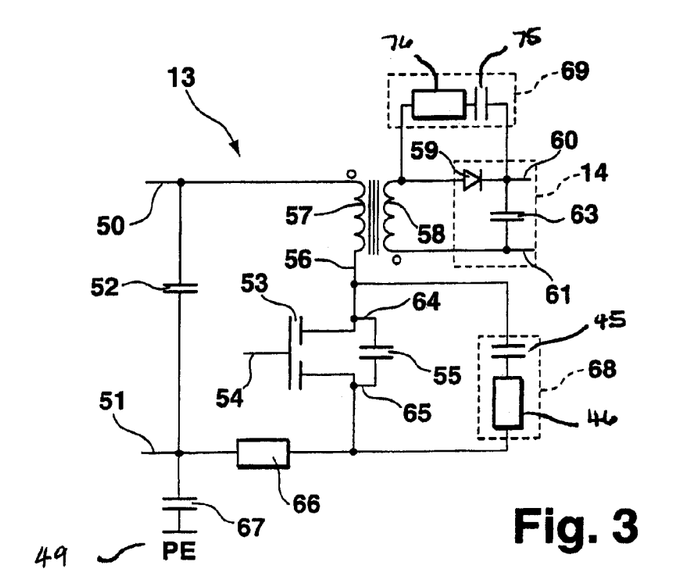
FIG. 3 is a detailed illustration of a flyback converter and a rectifier that can be used in the aircraft induction oven excitation arrangement of FIG. 2.

FIG. 3 illustrates, by way of example, the converter 13 and the rectifier 14. The converter 13 has an input connection 50 for receiving the positive rectified voltage from the power supply rectifier 11, an input connection 51 for receiving the negative voltage from the power supply rectifier 11, and a capacitor 52 for filtering. Furthermore, the converter 13 can be constructed as a flyback converter.

The flyback converter 13 includes a switching element 53 that is constructed in the embodiment as a transistor such as a MOSFET and that has a gate connection 54, a source connection 65, and a drain connection 64. The PFC controller 12 (not illustrated in FIG. 3) is connected to the gate connection 54. The PFC controller 12 can be indirectly connected to the gate connection 54 by means of an intermediate arrangement having additional driving elements. A capacitor 55 is inherently contained in the switching element 53.

The switching element 53 can be constructed so as to have an (output) self-capacitance (the capacitance at capacitor) 55 that changes with the voltage across the opened switching element, the self-capacitance 55 decreasing as the voltage increases. The switching element is operated at a frequency of >200 kHz, preferably ≧250 kHz.

The switching element 55 may have a self-capacitance of ≧about 5000 pF at voltages of ≦about 25 V across the opened switching element. These requirements are complied with in particular by transistors of the $C_x$ series from Infineon Technologies, in particular an IPW60R045CS, which can be used in the excitation arrangement 10. In one implementation, the self-capacitance of the switching element 53 changes in a highly non-linear manner with the voltage change. This means that, although the switching element 53 may have high self-capacitance at relatively low voltages, the self-capacitance decrease to a relatively low capacitance at higher voltages that are significant for the applications of the switching element.

To increase reliability, the converter 13 includes a means for galvanic isolation such as a transformer 56 having a primary winding 57 and a secondary winding 58. The transformer 56 transports the electrical power from the primary side of the transformer 56 to the secondary side of the transformer 56. The transformer 56 can have a leakage inductance of less than about 1 µH at the primary side and less than about 1 µH at the secondary side. In particular, the transformer 56 can have a ferritic core to improve coupling and reduce weight.

The rectifier 14 includes a diode 59 and a capacitor 63. The diode 59 rectifies the alternating current produced using the switching element 53 so that a positive or negative voltage is applied at output connections 60, 61, respectively, of the rectifier 14. The capacitor 63 serves to smooth the direct voltage from the converter 13.

The converter 13 includes a shunt resistor 66 connected between the ground potential (that is, the source connection 65 of the MOSFET 53) and the negative potential (that is, the input connection 51 for the negative voltage). A voltage that is proportional to the current is applied across the shunt resistor 66 and is measured by the PFC controller 12, and used for control. An anti-interference capacitor 67 (such as a Y capacitor) is connected between the negative potential at the power supply rectifier 11 (that is, the input connection 51 for the negative voltage) and a protective conductor PE 49, which is provided to protect against electric shock and can be connected, for example, to an earthed point of the source, an artificial neutral, an earth electrode, or a main earth terminal. Such an arrangement can be more advantageous than a direct arrangement in which the capacitor 67 is connected to the ground potential (that is, source connection 65 of the MOSFET 53). The anti-interference capacitor 67 is not positioned at the ground potential, but is instead positioned at the negative potential of the power supply rectifier to reduce interference in the measurement of the current and therefore reduce errors in the PFC controller 12. Using the other connection thereof, the capacitor 67 is connected to the protective conductor PE. In one implementation, the capacitor 67 has a capacitance of about 4.7 nF.

At the primary side, and parallel with the drain source connection of the switching element 53, a snubber circuit 68 is connected. The snubber circuit 68 has a capacitor 45 and a resistor 46, and limits voltage peaks during switching operations and converts leakage energy from the leakage inductor of the primary side into heat. At the secondary side of the transformer 56, and being parallel with the diode 59, another snubber circuit 69 is connected that also has a capacitor 75 and a resistor 76, and performs the same function on the secondary side as function performed by the snubber circuit 68 at the primary side.

The switching element 53 can have a turn-on resistance of ≦about 0.1Ω, and is switched on and off at a considerably higher switching frequency (for example, approximately 200 kHz) than the power supply frequency (380-800 Hz). In the switched-on state, a current is produced in the primary winding 57 that, when the switching element 53 is in the switched-off state, charges the capacitor 55. The majority of the current in the primary winding 57 is, however, coupled to the secondary winding 58 and causes the diode 59 to conduct and charges the capacitor 63. In the switched-off state, the rectified voltage between the connections 50 and 51 plus the voltage across the primary winding 57 of the transformer 56 is present between the drain connection 64 and the source connection 65 of the switching element 53. The voltage across the primary winding 57 is dependent on the output voltage that is produced at the connections 60, 61.

The rectified voltage at the connections 50 and 51 is not constant, but instead pulses with sinusoidal waves between 0 V and the maximum voltage, which, in aircraft, is approximately 160 V peak voltage. The PFC controller 12 measures the voltage between the connections 50 and 51. When the voltage that is present at this location also truly follows the characteristic line according to FIG. 4a, the PFC controller 12 controls the switching element 53 in such a manner that sufficiently low levels of harmonic frequencies are produced. This characteristic line shown in FIG. 4a can be achieved using the excitation arrangement 10.

Figure 4A:
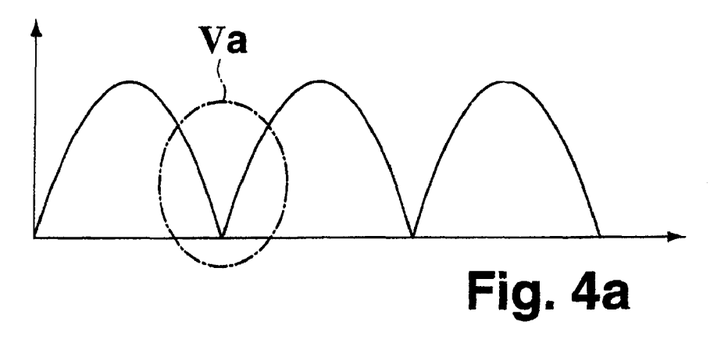
FIG. 4a is a graph that shows a possible input voltage characteristic of a switching element in the converter of FIG. 3.
Figure 4B:
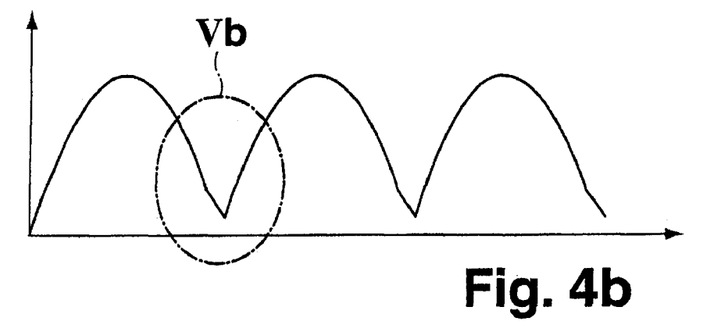
FIG. 4b is a graph that shows an input voltage characteristic of a switching element in a converter that can be used in an aircraft induction oven excitation arrangement.

In an arrangement that uses a switching element having high self-capacitance $C_{OSS}$ however, the voltage between the connections 50 and 51 often follows a voltage characteristic according to FIG. 4b. However, with a voltage characteristic of the type shown in FIG. 4b, the PFC controller 12 may not sufficiently suppress the harmonic frequencies. In Application Note AN1214, the distortion of the input voltage shown in FIG. 4b is attributed to the capacitor 52 in the primary circuit having a capacitance value that is too high. However, the capacitor 52 is not solely responsible for the distortion of the input voltage. Additionally, inadequate coupling from the primary side to the secondary side that can result to a large extent from an excessively large self-capacitance 55 and often poor coupling in the transformer 56 is also responsible for such input voltage distortion.

As the rectified power supply voltage decreases, the current values in the primary winding 57 also become very small. The stored electrical power in the primary winding 57 is therefore too small to completely charge the capacitor 55. The voltage at the secondary winding 58 is therefore not sufficiently high to cause the diode 59 to conduct. In this case, the electrical power is not supplied to the secondary circuit (which includes the secondary winding 58, the diode 59, and the capacitor 63), but instead remains in the primary circuit (which substantially includes the capacitor 55, the primary winding 57, and the capacitor 52). The voltage between the connections 50, 51 is therefore not completely suppressed, and the PFC controller might not function as provided for and excessively high harmonic frequencies could be produced.

Figure 5A:
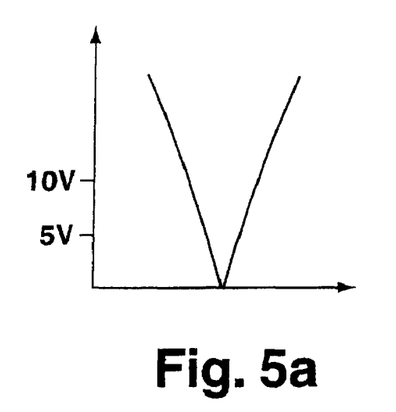
FIGS. 5a,b are two graphs of portions of the voltage characteristics of FIGS. 4a, 4b.
Figure 5B:
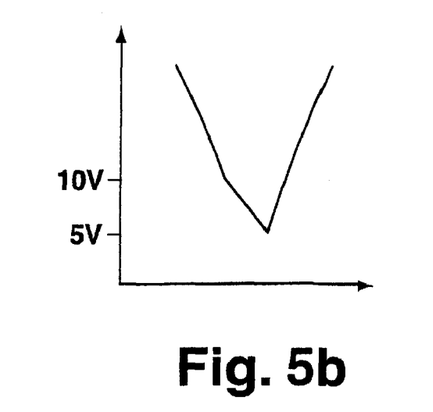

As shown in FIG. 5a, which illustrates a section of the voltage characteristic of FIG. 4a, the voltage reaches 0 V. This is near to an ideal shape for the voltage, and the harmonic frequencies can be substantially reduced. Such a shape can be achieved with a switching element 53 such as a transistor having a resistance $R_{dson}$ ≦about 0.1Ω and a non-linear self capacitance $C_{OSS}$ 55 that is below about 200 pF at voltages of >about 200 V. If the switching element 53 is a transistor having a higher self-capacitance $C_{oss}$, then the voltage characteristic according to FIG. 5b is brought about, and the reversal point is at approximately 5 V (not at about 0 V, as in FIG. 5a) so that harmonic frequencies are produced. A higher $R_{dson}$ is not used in aircraft induction oven excitation arrangements since the high levels of current could produce too high a power loss in the transistor 53.

If the transformer has a transformation ratio of between 1:1 and 1:2, preferably of approximately 1:1.4, it is possible to achieve a balanced voltage load of the power semi-conductor elements which are built-in in the aircraft induction oven excitation arrangement.

Figure 6A:
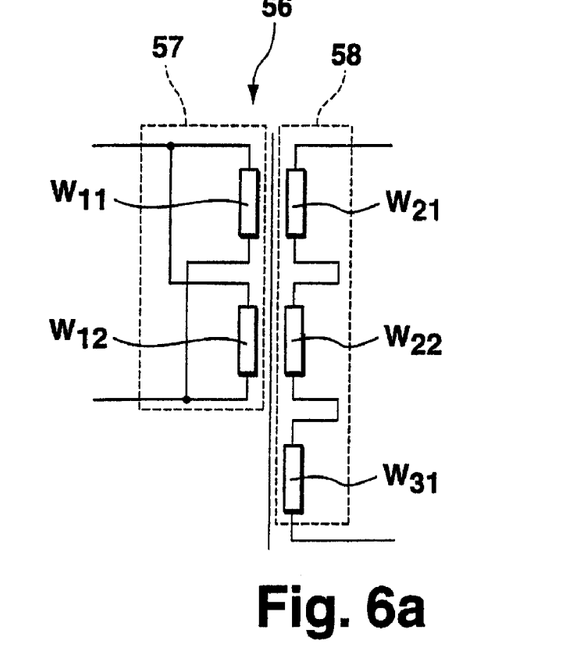
FIG. 6a is a circuit diagram that illustrates the wiring of a transformer of the flyback converter.

FIG. 6a illustrates the transformer 56 as a circuit diagram. The primary winding 57 includes the winding components W11 and W12 that are connected in parallel. The secondary winding 58 has the three-part windings W21, W22, and W23 that are connected in series. In this way, the transformer 56 can be constructed such that it has particularly low leakage.

The (part) windings of the primary and secondary windings can be wound together in an interlocking manner on a core. The (part) windings can be wound on the core in the sequence W21, W11, W22, W12, W23. The core can be constructed in the manner of a shaped core of ferrite material. A transformer of this type is suitable for high frequencies.

Figure 6B:
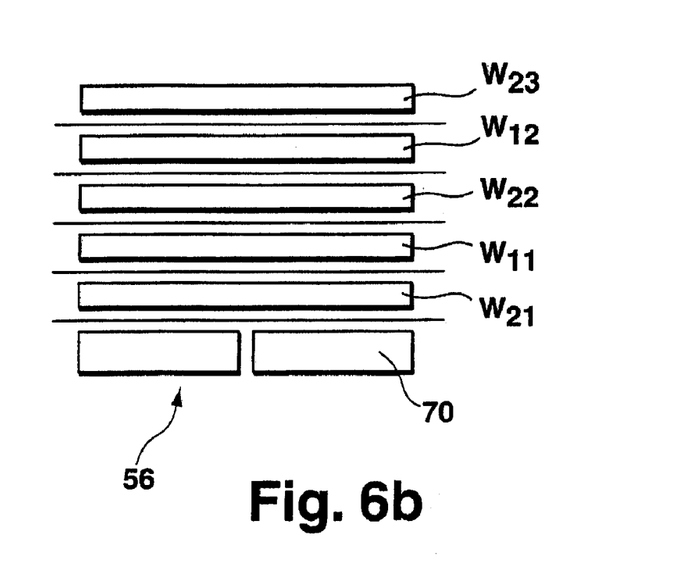
FIG. 6b is a schematic illustration of the transformer.

In the illustration of FIG. 6b, it can be seen that the winding components W21, W11, W22, W12, and W23 are interconnected in this sequence, the winding components W11-W23 being arranged around a core 70 that is produced from ferrite material. The windings can be produced from flat copper strip. The transformer 56 can have a transformation ratio of 1:1.429 and a winding ratio of 14:20.

Good coupling of the primary side and the secondary side can be achieved with low leakage losses. The self-capacitance of the transformer is reduced by using the flat copper strip by means of the interlocking arrangement. The electrical power can therefore be coupled to large extent from the primary side to the secondary side of the transformer. On the other hand, coupling loss could lead to the diode 59 at the secondary side not being able to conduct and the electrical power remaining in the primary side of the circuit, whereby harmonic frequencies and losses may be brought about.

Other Implementations

A number of implementations have been described. Nevertheless, it will be understood that various modifications can be made. Accordingly, other implementations are within the scope of the following claims.

For example, the excitation arrangement 10 can be used in any suitable movable craft, such as, for example, boats, submarines, ferries, spacecraft, recreational vehicles, and automobiles.

What is claimed is:

1. An aircraft induction oven excitation arrangement comprising;
   a connection for a power supply system on the aircraft;
   a power supply rectifier connected to a phase of the power supply system;

a converter that is arranged downstream of the power supply rectifier and that comprises a switching element;

a controller that drives the converter;

a rectifier that is arranged downstream of the converter and that produces an intermediate circuit voltage;

an inverter that is connected to the intermediate circuit voltage;

wherein the switching element has a turn-on resistance $R_{dson} \leq 0.1\Omega$ and a self-capacitance of $\leq 200$ pF at voltages of $\geq 200$ V across the switching element.

2. The aircraft induction oven excitation arrangement of claim 1, further comprising:

a connection on each phase of the power supply system;

a power supply rectifier on each phase of the power supply system;

a converter on each phase of the power supply system;

a controller on each phase of the power supply system; and a rectifier on each phase of the power supply system and arranged downstream of each converter to produce an intermediate circuit voltage for each phase of the power supply system.

3. The aircraft induction oven excitation arrangement of claim 1, wherein the switching element is configured for the frequency at which the on-board aircraft power supply system operates.

4. The aircraft induction oven excitation arrangement of claim 1, wherein the self-capacitance changes with the voltage across the opened switching element.

5. The aircraft induction oven excitation arrangement of claim 4, wherein the self-capacitance decreases as the voltage across the opened switching element increases.

6. The aircraft induction oven excitation arrangement of claim 1, wherein the converter includes a means for galvanic isolation.

7. The aircraft induction oven excitation arrangement of claim 6, wherein the converter is constructed as a flyback converter, and the means for galvanic isolation is constructed as a transformer having a primary winding and a secondary winding, the transformer having a leakage inductance of less than 1 µH at the primary side and less than 1 µH at the secondary side.

8. The aircraft induction oven excitation arrangement of claim 1, wherein the self-capacitance of the switching element changes in a non-linear manner with the voltage across the switching element.

9. The aircraft induction oven excitation arrangement of claim 1, wherein the power supply rectifier is connected between an output connection of the power supply system and a neutral connection of the power supply system.

10. The aircraft induction oven excitation arrangement of claim 1, wherein the switching element has a self-capacitance of $\geq 5000$ pF at voltages of $\leq 25$ V across the opened switching element.

11. The aircraft induction oven excitation arrangement of claim 1, wherein the converter includes a transformer having a primary winding and a secondary winding, wherein the primary winding is constructed as a parallel arrangement of a plurality of part windings and the secondary winding is constructed as a series arrangement of a plurality of part windings.

12. The aircraft induction oven excitation arrangement of claim 11, wherein the part windings of the primary winding and the secondary winding are wound in an interlocking manner on a core.

13. The aircraft induction oven excitation arrangement of claim 11, wherein the windings are formed from a flat copper strip.

14. The aircraft induction oven excitation arrangement of claim 11, wherein the transformer has a transformation ratio of between 1:1 and 1:2.

15. The aircraft induction oven excitation arrangement of claim 11, wherein the transformer has a transformation ratio of 1:1.4.

16. The aircraft induction oven excitation arrangement of claim 1, further comprising an anti-interference capacitor connected between the power supply rectifier and a protective conductor.

17. The aircraft induction oven excitation arrangement of claim 16, wherein the anti-interference capacitor is connected between a negative potential of the power supply rectifier and the protective conductor.

18. The aircraft induction oven excitation arrangement of claim 1, wherein the switching element is operated at a frequency of >200 kHz.

19. The aircraft induction oven excitation arrangement of claim 1, wherein the switching element is operated at a frequency of >250 kHz.

20. The aircraft induction oven excitation arrangement of claim 1, comprising for each phase of the power supply system a power supply rectifier having a flyback converter arranged downstream of the power supply rectifier, a controller, and a rectifier that is arranged downstream of the flyback converter, wherein all the intermediate circuit voltages are interconnected to form a common intermediate circuit voltage.

21. The aircraft induction oven excitation arrangement of claim 1, further comprising an output connection that connects to at least a portion of an oscillating circuit.

22. The aircraft induction oven excitation arrangement of claim 1, further comprising at least one capacitor downstream of the inverter.

23. An aircraft induction oven comprising:

a plurality of induction oven excitation arrangements, each excitation arrangement comprising:

at least one connection for a power supply system on the aircraft;

at least one power supply rectifier connected to a phase of the power supply system;

at least one converter that is arranged downstream of the at least one power supply rectifier and that comprises a switching element;

a controller that drives the at least one converter;

a rectifier that is arranged downstream of the at least one converter and that produces an intermediate circuit voltage;

an inverter that is connected to the intermediate circuit voltage;

wherein the switching element has a turn-on resistance $\leq 0.1\Omega$ and a self-capacitance of $\leq 200$ pF at voltages of $\geq 200$ V across the switching element; and a common control unit that couples to each of the induction oven excitation arrangements.

\* \* \* \* \*

UNITED STATES PATENT AND TRADEMARK OFFICE
CERTIFICATE OF CORRECTION

| | | |
|---|---|---|
| PATENT NO. | : 7,718,934 B2 | Page 1 of 1 |
| APPLICATION NO. | : 11/381058 | |
| DATED | : May 18, 2010 | |
| INVENTOR(S) | : Marko Scherf | |

It is certified that error appears in the above-identified patent and that said Letters Patent is hereby corrected as shown below:

On the Title page, under Assignee, delete "Ruettinger Elektronik GmbH + Co. KG, Freiburg (DE)" and insert --Huettinger Elektronik GmbH + Co. KG, Freiburg (DE)--.

In column 8, lines 63-64, delete "comprising;" and insert --comprising:--.

Signed and Sealed this

Thirty-first Day of August, 2010

David J. Kappos
*Director of the United States Patent and Trademark Office*